United States Patent
Piovoso et al.

(10) Patent No.: US 6,627,127 B1
(45) Date of Patent: Sep. 30, 2003

(54) METHOD FOR CONTROL OF EXTRUSION PROCESS

(75) Inventors: Michael Joseph Piovoso, Newark, DE (US); Paul Thomas Shea, Freehold, NJ (US); Chi-Kai Shih, Chadds Ford, PA (US); Mark David Wetzel, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/806,280

(22) PCT Filed: Oct. 1, 1999

(86) PCT No.: PCT/US99/22579

§ 371 (c)(1), (2), (4) Date: Mar. 28, 2001

(87) PCT Pub. No.: WO00/20190

PCT Pub. Date: Apr. 13, 2000

Related U.S. Application Data

(60) Provisional application No. 60/102,758, filed on Oct. 2, 1998.

(51) Int. Cl.$^7$ .................................. B29C 47/92
(52) U.S. Cl. ............... 264/40.4; 264/40.7; 425/145
(58) Field of Search ..................... 264/40.4, 40.7, 264/349; 425/145

(56) References Cited

U.S. PATENT DOCUMENTS 5,352,393 A * 10/1994 Joseph ................. 264/408

OTHER PUBLICATIONS

Steven B. Dickson et al., "Reactive Extrusion of Polypropylene with Pulsed Peroxide Addition: Process Control Aspects", Industrial & Engineering Chemistry Research, vol. 36, No. 4, Apr. 1997, pp. 1067–1075.*

* cited by examiner

Primary Examiner—Mark Eashoo

(57) ABSTRACT

Disclosed is a process for controlling extrusion processes by applying dynamic periodic pulses to the process throughout and during the process, analyzing the pulse response data and feeding back the results of the analysis to the process parameters and product properties.

1 Claim, 2 Drawing Sheets

METHOD FOR CONTROL OF EXTRUSION PROCESS

This application claims the benefit of provisional application Ser. No. 60/102/758 filed Oct. 2, 1998.

FIELD OF THE INVENTION

This invention relates generally to a method for controlling the extrusion of fluid materials. More particularly, the invention relates to control of the properties of the material being extruded, with or without the physical parameters of the extrusion process, using a twin screw extruder.

BACKGROUND OF THE INVENTION

Ever since the advent of polymeric materials and the mixing or processing thereof using extrusion techniques, the art has tried to develop methods of controlling the properties of the composition or compound being extruded or the parameters of the extrusion process itself, such as temperature, throughput, etc. These methods ranged early on from simple analysis of the resulting extruded product, then attempting to adjust extrusion conditions to change the characteristics of the resulting product to very sophisticated mathematical methods such as those described by Costin et al. in Polymer Engineering and Science, mid-December, 1982, Vol. 22, No. 17, pp. 1095–1108. Costin et al. describes a method to control a plasticating extruder by running a "steady state, step, and time-series analyses" during extrusion, then derived a "transfer function" for purpose of process control. Specifically, Costin et al. describe a method to generate a transfer function between extruder pressure and the screw speed to regulate extruder pressure by using the screw speed as a manipulated variable. Costin et al. developed the control algorithm from the transfer function generated. Results were obtained by testing the effectiveness of the control in the face of a pressure surges and a disturbance in feed quality.

While such methods have merit, they do not address the need to dynamically control the extrusion process, in order to control the physical properties of the final product, i.e., exercise product and process control "on the fly". An object of this invention is to provide a dynamic control method for the product properties of the extrusion process.

SUMMARY OF THE INVENTION

This invention provides for an improvement in a process for controlling the properties of a material extruded in a continuous extrusion process. The improvement resides in the application of multiple periodic pulses, as defined herein below, throughout the entire period of the said continuous extrusion process, in order to provide continuous control over the properties of the continuously extruded material.

More particularly, (1) a pulse of known amount of material is added to a steady extrusion process with changes in product properties, (2) dynamic signals generated by a extruder drive and control system are transmitted to data acquisition system signal conditioning front end hardware, which isolates, amplifies and filters the dynamic signals and outputs analog signals, (3) analog signals output by the data acquisition system signal conditioning front end hardware are converted to digital signals, the digital signals are transmitted to a pulse analysis and control computer, which calculates setpoints, which can be transmitted back to the extruder drive and control system or a feed control system used by the extrusion process.

DETAILED DESCRIPTION OF THE INVENTION

As used to describe this invention, a pulse is defined as a perturbation of the normal, steady-state feed rate in an extrusion process. The pulse is comprised of a material mass addition or subtraction at the feed port locations of the extruder. The pulse material can be one or more of the feed ingredients or a different material. Time of addition can be a sudden change and recovery in short duration (approximate impulse) or an extended time period, such as a step change, sinusoidal or other periodic function and time series functions (pseudo-random binary sequence for example).

Figure 1:
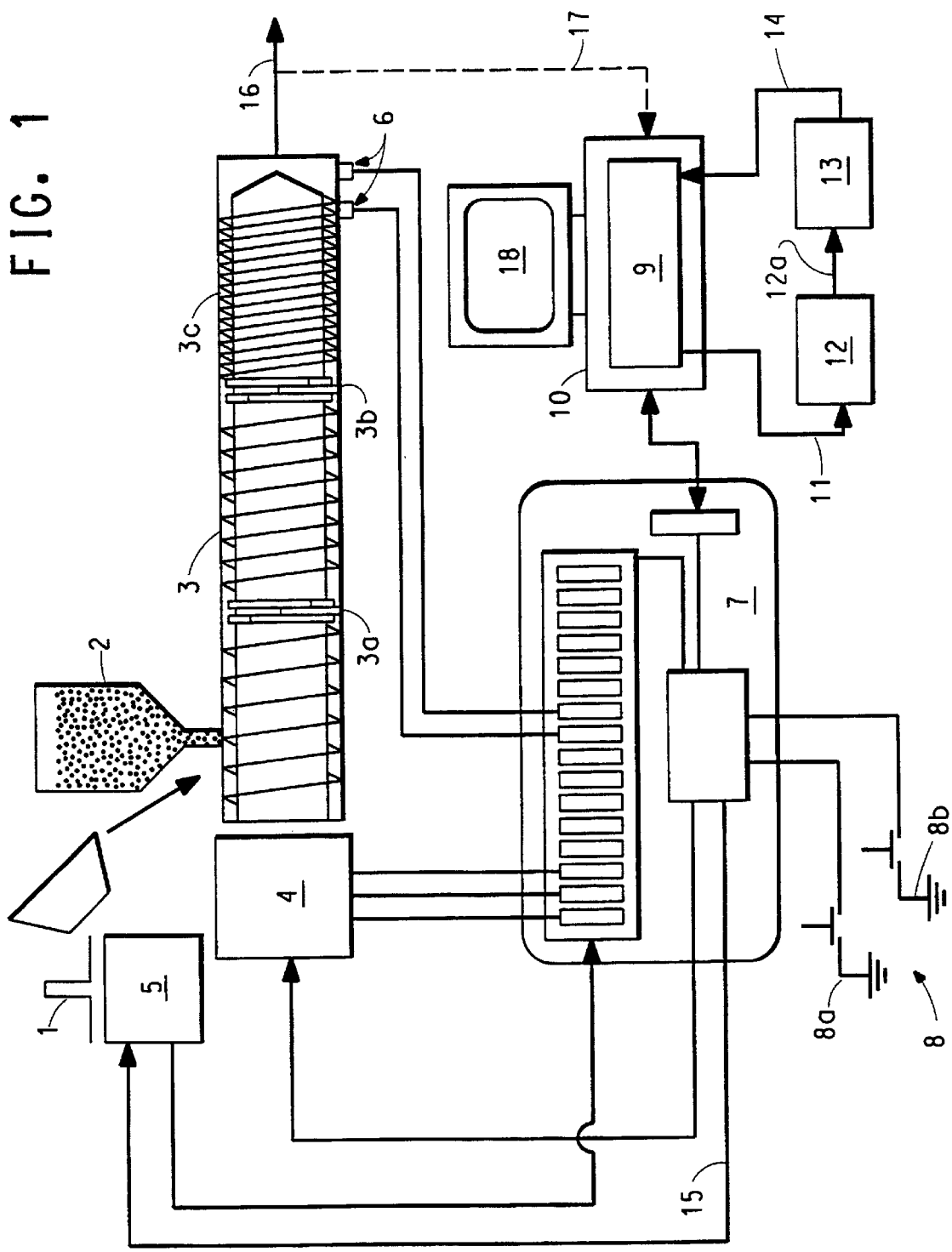
FIG. 1 is a schematic flow diagram of means of the dynamic pulse perturbation process of the invention.

Referring to FIG. 1, a pre-weighed mass of material, a pulse mass 1 is added to the extrusion process while running at its normal, steady-state operating condition. The material can be one or more of the feed ingredients, or a different material intended to perturb the steady-state operation via a mass or chemical disturbance. The pulse test is performed every time a control decision is required. That is, the pulse mass is introduced to the steady-state extrusion process on a regular, repeated basis. The feed system 2 delivers the addition of materials, the steady state feeds, in normal steady state operation, i.e. an unperturbed continuous operation of the extruder. The steady state feed system can consist of one or more metering devices to control ingredient addition to the extruder 3 in normal, steady-state operation. Additional feed systems 2 can be added along extruder 3, if desired. The pulse mass 1 is added at the point where the feeds enter the extruder 3. Extruder 3 is preferably a twin-screw (T/S) extruder, a mechanical device that melts, mixes and pumps polymeric or high-viscosity materials. A twin-screw, co-rotating extruder is a starve-fed device that consists of a barrel, die and screw. The process is the sequence of steps performed in the extruder from the feed addition through product forming in the dic at the exit. The primary actions monitored by the periodic pulse technique of this invention are: feed transport, melting, mixing, pumping and chemical reactions. Working zones of the screw are defined as the melting zone 3a, the mixing zone 3b and the pumping zone 3e. The product 16 is the material exiting the extrusion process. Extruder motor drive and control system 4 generates motor amperage, voltage and screw speed dynamic signals. These signals are connect to the data acquisition system signal conditioning front end hardware 7. While a number of parameters can be monitored using the dynamic pulse technique of this invention, motor amperage is the preferred variable to be monitored with this technique. Process ingredient steady-state feed rates are regulated by the feeder control system 5. Feed rate dynamic signals are measured by this system. Control setpoints 15 are received by this system. Point measurements, such as the measurement of pressure, temperature and residence time distribution (RTD), using transducers 6, can be taken by inserting transducers 6 into the extruder to monitor the machine and process material. These signals arc connect to the data acquisition system signal conditioning front end hardware 7. Pressure is a preferred variable to measure in this way in accordance with the preferred practice of this invention. The signal conditioning front end hardware 7 processes dynamic analog sensor signals and digital signals connected thereto.

Figure 2:
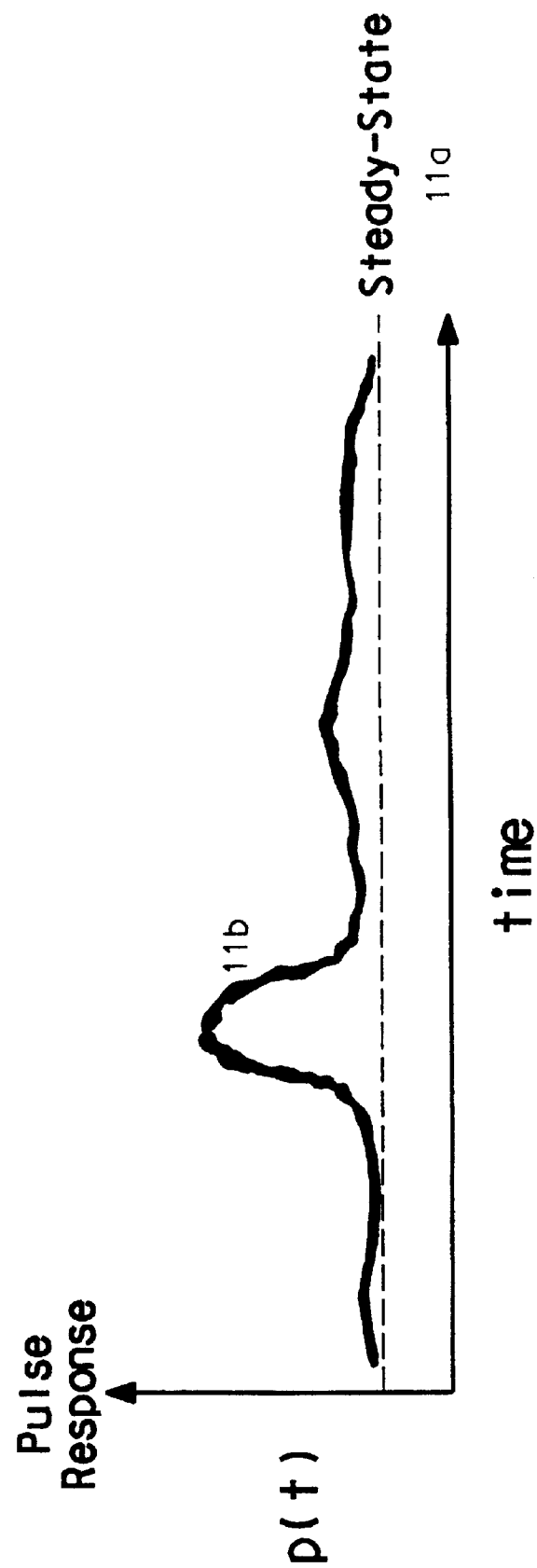
FIG. 2 is a graph of the Pulse Response.

This hardware isolates, amplifies and filters source signals. It also provides excitation voltages and currents to active sensors. Human operators or other equipment can initiate and control the pulse technique of this invention with a set of digital signals. The start test signal 8*a* initiates the data acquisition test cycle. The pulse status signal 8*b* indicates the time of addition of the pulse mass 1. The analog signals from the signal conditioning front end hardware 7 are converted to digital sequences with analog to digital (A/D) converters at the data acquisition hardware 9. The control setpoints 14 are converted to Analog signals with digital to analog (D/A) converters. Digital inputs 8 are converted to binary numbers. The pulse analysis and control computer 10 controls the pulse test cycle (or monitors the operator's actions), performs signal processing 12 to analyze the pulse response 11 input from the data acquisition hardware 9, calculates a control decision 13 and outputs the control setpoints 14 to the data acquisition hardware 9 or the extrusion process operator 18. The pulse analysis and control computer 10 may, optionally, input the product's 16 physical properties 17. The pulse response 11, shown in FIG. 2, consists of all input signals measured the signal conditioning front end hardware 7 and converted to digital sequences in time by the data acquisition hardware 9.

The pulse response 11 contains the steady-state data 11*a* and dynamic response data 11*b* from the pulse mass 1. The steady state data 11*a* represents the values of the measured inputs (4, 5, 6) under normal operating conditions. The dynamic response data 11*b* represents the change in the signals with time due to the pulse mass 1. Signal processing 12 analyzes pulse response 11 to obtain physical property estimates 12*a* or set of values used in the control computation 13. A model relating pulse response 11 to physical properties 17 may be used here. Thus the periodic pulse process of this invention is used to generate this model by performing the pulse test and obtaining samples of the product 16 and measuring the physical properties 17. The results of the signal processing 12 produces physical property estimates 12*a* as an input to the control model/decision 13. The Control algorithm calculates new control setpoint(s) 14 for the process. That is, based on the pulse response 11, any error in properties requires a control adjustment. The control setpoints 14 are a sequence of numbers generated for the next time interval that is used to manipulate the process. The outputs can be sent to the extruder motor drive and control system 4 and the feeder control system 5 through a D/A converter or the data acquisition hardware 9 and the signal conditioning front end hardware 7. The setpoint signals 15 are the digital or analog signals to the extruder motor drive and control system 4 and the feeder control system 5 to manipulate the process. A human or machine operator may also manipulate the system directly based on setpoint information presented at operator interface 18.

Generally, the so controlled extrusion process produces the product 16. The setpoint signals 15 and the human operator manipulate the process to maintain product quality. The extruder motor drive and control system 4 and the feeder control system 5 change extrusion conditions, the extruder 3 responds, and the product 16 is altered. The product 16 has a set of physical properties 17 that can be measured on or off-line. The goal of the extrusion control process of this invention is to maintain these properties within specification limits. The physical properties 17 are correlated to the pulse response 11 by the signal processing 12 and the control model/decision 13. Physical properties 17 are then estimated by the control model/decision 13 for manipulating the control setpoint(s) 14. The physical properties 17 can be measured during closed loop control to improve the control setpoint(s) 14. As stated above, a human or machine operator can initiate the pulse test cycle through the pulse analysis and control computer 10, observe the pulse response 11 and obtain control setpoint(s) 14.

In a typical industrial extrusion process, the periodic pulse extrusion control process of this invention is used to generate direct estimates of product physical properties on a frequent, periodic basis. That is, every time a control setpoint update is needed, the pulse test is performed. By introducing the pulse mass into the process operating at steady-state, the dynamic responses of measured variables in time, such as motor amperage and die head pressure, due to the disturbance are monitored. The responses are analyzed by the signal processing algorithm that estimates the physical properties to be controlled. The control model then calculates new setpoints or setpoint changes to be implemented by the operator or process control systems. The pulse test is performed at regular time intervals so that the control setpoints can be adjusted as often as is required to meet quality specifications.

In contrast, in conventional extrusion control processes, the goal is to reject disturbances detected in measured signals. The periodic pulse extrusion control process of this invention perturbs the process intentionally each and every time a product property measurement is required. The control setpoints computed from the pulse response model adjust for changes in ingredient and the extrusion process over time scales determined by the pulse test cycle interval.

As shown in FIG. 1, the fundamental extrusion apparatus is comprised of a feed system 2, i.e., a means of metering feed ingredients into one or more port locations of the extruder. In the invention, we prefer to use a starve-fed extrusion process, where the feed rates are set and controlled independently from the extruder screw speed (flood-fed single screw extrusion process rate is determined by the extruder screw speed). In the T/S extrusion process, ingredient feed rates are regulated with the feeder control system 5. The invention provides for the adjustment of the ingredient feeder controller setpoints. As far as the type of extruder to use, the invention is not limited to the use of a twin screw extruder, but preferred examples use modular, co-rotating, intermeshing T/S extruders. Modular twin screw extruders are typically comprised of:

segmented barrels with 2 bores that enclose the screw, including feed ports, closed barrels and vent ports, 8–0 transition piece and a die to form product strands, film or other shapes, two intermeshing screws located inside each barrel bore separated by a center-to-center distance, as described in detail in the book entitled "POLYMER EXTRUSION" by Chris Rauwendaal, Hanser Publishers, 1990. Chapter 10, "Twin Screw Extruders", that are comprised of screw shaft connected to the drive transmission, modular screw elements including a selection of one or more conveying bushings, reverse pumping bushings, kneading blocks, spacers, gear mixers, tip pieces and other geometry, drive motor, transmission and gearbox to turn the screw, barrel heaters and cooling system, control system to regulate barrel temperature and screw speed, and monitor amperage (torque) or power and maintain safe machine operating conditions.

Auxiliary equipment including vacuum handling system, strand quenching and pelletizing hardware can be used to solidify and cut the product into its final form.

Examples of conventional screw design used to melt, mix and pump a polymeric material system are shown in many publications, for example, H. Cartier and G.-H. Hu, Polymer Engineering and Science, June 1999, Vol. 39, No. 6, p. 998.

Machine material of construction is generally from steel, surface treated steel and other metal alloys for wear resistance. Polymeric materials (low and high viscosity), monomers, plasticizers, fillers and other ingredients constitute the feed materials. Many feeds are melted or fluidized in the extruder to enable mixing, forming and chemical reactions.

In T/S extruders, machine size is an important factor in determining production throughput. In general, different processes utilize different machine size and barrel configurations. Most important, different combinations of screw elements mounted on the screw shafts are used make up the screw design. The screw design in the T/S machine usually has groups of working elements (kneading blocks and gear mixers), or working zones, separated by conveying elements. So, a conventional screw design may have a melting zone to transform solid pellet or powder feeds into molten liquid, mixing zones to mix and react ingredients and a pumping zone at the end of the screw to drive the liquid product through the die. In an extrusion process, product physical properties 17 are measured to maintain quality and consistency. Most properties, such as Durometer Hardness, ASTM test, D2240, are measured in a laboratory off-line. In some applications, on-line measurements are possible and are useful in closed-loop control of the process. Without a direct, real-time, on-line measurement, a alternative method of inferential measurement is required in order to perform closed-loop control of the extrusion process to maintain the physical property of interest, Thus, the periodic pulse process of this invention is employed to obtain the requisite measurement estimate.

The prior art extrusion control process typically correlate a process parameter such as pressure to physical properties and use extruder sensor signals as part of a disturbance rejection control scheme. In this invention, the pulse is added to purposefully disturb the process every time a new measurement estimate is needed. In industrial practice, control based on pressure in an extrusion process is not a robust method. Too many other variables in the process cause the measured pressure and temperature to change, making the controller vulnerable to error. The dynamic response of the pulse is more immune to changes that affect traditional sensor measurements, such as melt temperature and pressure (especially the steady-state or slowly varying dynamics).

Extruder operating conditions depend on machine size. Machine size is determined by the barrel diameter. In the invention, machine sizes range from 30 mm and 40 mm (pilot scale) to 92 mm and 120 mm (plant scale). Typical throughputs range from 10 to 35 lb/hr (4.54 to 15.58 kilograms/hr)on the pilot scale, and 1000 to 6000 lb/hr (454 to 2724 kilograms/hr) on the plant scale. Barrel temperature setting depend on ingredient and product thermal properties. They may be set from 100° C. to 350° C. for typical applications. Screw speed (RPM) typically varies from 100 to 500 RPM. Specific experimental conditions can be found in the Examples of the invention herein below.

EXAMPLES

The following representative examples illustrate the process and catalyst compositions of this invention. All parts, proportions, and percentages are by weight, unless otherwise indicated. In each example, the following procedure was used unless otherwise noted.

In the specific examples which follow, the rubber is an SBS (Styrene-Butadiene-Styrene) or SIS (Styrene-isoprene-Styrene) resin, manufactured by Shell Chemical Corporation (Houston, Tex.) under the trade name Kraton®. The monomer is hexamethylene diacrylate orhexamethylene dimethacrylate. The plasticizer is a polybutadiene oil, Nisso Oil manufactured by Nippon Soda Co, Ltd. Tokyo, Japan. The product property utilized in the examples which follow was hardness, as measured by a commercially available durometer using ASTM test, D2240. The durometer used was a Zwick 3123 & 3124 hardness tester available from Zwick of American located at 18 Thompson Rd., East Windsor, Conn., telephone (203)-623-9475.

Hardness was controlled by changing the percent monomer and/or rubber in the feed. The twin screw extruder utilized was a ZSK 30 mm manufactured by Werner-Pfleiderer. Rubber or a pre-compounded binder (rubber, plasticizer and wax) was added at barrel 1, a monomer solution (of monomer, initiator, inhibitor, and dye) at barrel 3 and the remaining plastisizer at barrel 5 in a nine barrel extruder. The screw configuration was a combination of pumping and kneading elements that allows melting of the rubber binder and mixing of the monomer solution and plastisizer into the binder matrix. Throughput was 20 pounds per hour (9.1 kilograms per hour) at 300 RPM.

The extrusion procedure per se which was utilized in the Examples below is described in U.S. Pat. No. 5,135,837.

Model Development and Usage

A model to estimate the chemical composition is needed to do on-line control. This model was generated using a standard chemometric method, partial least squares, (PLS). A description of this method is found in the book by K. R. Beebe, R. J. Pell, and M. B. Seasholtz, *Chemometrics—A Practical Guide*, John Wiley & Sons, 1998, ISBN 0-471-123451-6, pp. 278–339.

Hardness was measured off line for the sake of model development. A model is needed to give on-line predictions of the composition and from that a hardness value that can then be used to control this product property. To generate the data model, a series of experiments were run on the above mentioned extruder. The feed rate was held constant at a constant 20 pounds per hour (9.1 kilograms per hour), but the ratio or rubber to monomer was varied as 100/0-90/10-80/20-70/30-60/40-50/50-40/60-30/70-20/80-10/90-0/100. At each of the states, a pulse test was run with the exit pressure and barrel temperature measured by transducers 6 in FIG. 1, motor amps and screw revolutions per minute signals being sampled at 20 samples per second for a total of four minutes. The data were processed and a chemometric model was generated to predict the composition ratio based on only the amperage response to the pulse. The signals, other than motor amperage, did not markedly improve the performance in this case, but can be utilized, if desired, in other applications.

This model is used in controlling the extruder. For example, suppose that the ratio of rubber to monomer is unknown. A sequence of six pulse experiments is run and the motor amp signal is applied to the model. The average of the predicted composition for each of the six runs is used as the product composition. That number is compared to the desired composition ratio that is needed to produce the required hardness. Based on the difference between the desired composition and the estimated one, a correction is made to the flow rates of both the rubber and monomer so that the total flow remains constant but the composition ratio changes to the desired one.

Signal Processing and Model Development

In the Examples below, the following steps were used in the model development. All software is in MATLAB, Version 5.2, sold by The Mathworks, Inc. 21 Elliot Street, South Natick, Mass. 01769.

1). A pulse of material was added to the feed system 2 about 90 seconds after the initiation of the data collection. The 90 seconds allows sufficient time to estimate the baseline behavior that was then used to determine the deviations from steady state. The signals (motor amps, exit pressure, melt temperature, motor revolutions per second (RPM) and push button status) were sampled at 20 samples per second for a total of 4 minutes by the data collection computer (data aquisition hardware 9 in FIG. 1).

In the Examples below, only the motor amperage signal was used. To insure that data were properly time-aligned, one of the amperage signals was chosen to serve as a reference sample to be used to align the rest of the amperage pulse responses. All pulses were shifted so as to match the reference as closely as possible. Alignment is necessary to correct the error in the time of the introduction of the pulse as indicated by the manual push button. The technique used for alignment is shown in the Matlab function "genpulsedatn1", detailed in the specific code below. This code uses the Matlab cross correlation function. The peak of the cross correlation defines the shift of one signal relative to another that gives the best data match that is the largest correlation between the two sets of data. The data are shifted by the amount determined by the location of the peak of the cross correlation function. Once the data are aligned, a total of 3000 data points are chosen. Typically the pulse is introduced at the $90^{th}$ second or the $1800^{th}$ data point. The data used include 1200 prior to the introduction of the pulse and 1800 after. Using the Matlab decimate function, the data are decimated by a factor of 10 to produce a total of 300 data points for each pulse test. This is a standard way of processing the pulse data for display and other purposes such as model building.

The Matlab code for preprocessing these data is as follows:

The "%" sign at the beginning of the line indicates a comment which explains the code, rather than a programming step.

```
% function that aligns the pulses so that the beginning of
  the pulse location matches % closely as possible.
function [amprslt,pressrslt,temprslt,ampind]=
  genpulsedatn1 (name,Itag,refname) %
% name is an array of file names that contain pulse data
% Itag gives the column numbers that contain the data to
  be aligned.
% Itag(1)=amps, itag(2)=melttemp, itag(3)=press, and
  Itag(4)=startpulse
% refname is the filename that has the reference data to be
  used for aligning.
% amprslt, pressrslt, temprslt are the motor amps, exit
  pressure and melt % temperature after alignment.
% ampind contains the information as to how far the data
  must be shifted % so as to align
% pwrrslt=[ ];pressrslt=[ ];ssindex=[ ];amprslt=[ ]; In,m)=
  size(name);
% get the number (n) of files and the size of the length of
  the name (m) for i=1:n,
eval(['load' name(i,:)]);
% Load the data into memory. It is contained in "Pulse_
  Data_Matrix."
f1=Pulse_Data_Matrix;
% f1 is a temporary array to hold the data amp(:,i)=f1(:,
  Itag(1));
% pick out the motor amps
press(:,i)=f1(:,Itag(3));
% pick out the exit pressure
temp(:,i)=f1(:,Itag(2));
% pick out the melt temperature
is if nargin==3 & i==1,
eval(['load ' refname]);
% load the reference array if named
f1=Pulse_Data_Matrix
refamp=f1(:,Itag(1));
%reference signal if for alignment
clseif i==1,
refamp=amp(:,1);
% If no reference is given use the amps from the first file
  end
crcor=crosscor(refamp(1750:2400),amp(1750:2400,i),
  60);
% Computes the cross correlation between reference and
  the actual signal
% Expect beginning for the pulse is at the 1800th data
  point.
[ampmax(i), ampind(i)]=max(crcor);
% Find the peak amperage and its location
ampx=amp(1200+(ampind(i)-61):4199+(ampind(i)-61),
  i);
% Take 3000 data points after shifting by the proper
  amount for pressure
% temperature and amperage.
pressx=press(1200+(ampind(i)-61):4199+(ampind(i)-
  61),i);
tempx=temp(1200+(ampind(i)-61):4199+(ampind(i)-
  61),i);
amprslt(:,i)=decimate(ampx,10);
% decimate all the data by a factor of 10
pressrslt(:,i)=decimate(pressx,10);
temprslt(:,i)=decimate(tempx,10);
end % Return the results
```

Data, typically motor amps and exit pressure, are collected off the extruder at 20 samples per second. Data collection starts 90 seconds before the introduction of pulse material and extends for a total of four minutes. In the practice of this invention, the data are decimated to 2 samples per second using the "decimate" algorithm found in Matlab® by The Mathworks, Inc. The decimated data are then baseline corrected to account for non-zero and drifting baselines. Although there are many techniques for correcting the baseline, a straight line approach is used herein. Two averages are computed; one based on the first 90 seconds before the application of the pulse of material, and the other on the last 90 seconds of the data, a period of time after which all the pulse material has exited the extruder. A straight line is used to connect the averages from, the start of data collection to its end. The observed data are subtracted from the evaluation of the straight line at the same corresponding times to produce a baseline corrected data that are then used for analysis.

2). A Partial Least Squares (PLS) model was then built based on approximately 70 seconds of data after the introduction of the pulse. These data begin with the introduction of the pulse material. PLS is a subspace modeling technique well known to those skilled in the art. The method was applied in the following way. The motor amp data were organized into a matrix where each row corresponds to approximately 70 seconds sampled data from a given pulse experiment. Another column vector that is the monomer composition corresponding to the material in the extruder at the time of the introduction of the pulse was formed. With these two matrices, the PLS algorithm was applied using the PLS_Toolbox Version 2.0, Eigenvector Research, Inc., 830 Wapato lake Road, Manson, Wash. 98831. Pages 81–84 of the manual explain PLS algorithm and pages 129–134 explain the calling sequences of the PLS algorithm used to generate the model. All models were cross validated as explained in the PLS_Toolbox manual.

3). The model used for generating the prediction that was the bases for control was designated predmonomer12_3_97. The code for doing the prediction is shown below:

```
% Script to test the predictive power of model
    predmonomer12_3_97
% Clear variables that might still be in memory
clear amp1 press1 temp1 ssindex
% Generate data by aligning pulse to reference and
    decimating
[amp1,press1,temp1,ssindex]=genpulsedatn1(filename,
    Itag,name(1,:));
% Get size of data and number of samples (m)
[n,m]=size(amp1);
% Eliminate the baseline by computing the average of the
    signal for
% sixty seconds prior to the introduction of the pulse.
for i=1:m, amp1(:,i)=amp1(:,i)-mean(amp1(1:60,i));
end
% Put together approximately 70 seconds worth of data
    beginning with start of pulse
X=[amp1(60:200,:)'];
% Mean center data as was done in model
X=X-ones(m,1)*Xnewmn;
% Predict the monomer composition
monomerprednew=X(:,index1)*bnew+monomernewmn;
```

EXAMPLE 1

Compounding of Rubber and Acrylic Monomer

An extrusion was performed by mixing rubber PLX with monomer and Nisso oil defined above on a ZSK-30 extruder, a commercially available twin-screw extruder manufactured by Krupp, Werner & Pfleiderer Corp., Ramsey, N.J. Rubber PLX is a pre-compounded composition of the following (all percentages are by weight):

SIS Kraton® 1107 83.2%
PI liquid polyisoprene with molecular weight of 29,000; LIR30—Kuraray Chemical Co., Tokyo, Japan—9.05%
Resin—Piccotex copoylmer of vinyl toluene and alpha methyl styrene
Piccotex® copolymer of vinyl toluene and alpha-methyl styrene;
Piccotex® 100S-Hercules Co, Wilm., Del. 6.64%
Wax—Ceresin Wax, 1.11
The monomer is composed of weight percents of
1,6 hexamediol diacrylate—40%
1,6 hexamediol dimethacrylate—28%
initiator 2-phenyl-2,2dimethoxy acetophenone 15.3%
inhibitor 2,6-dimethyl-4-t-butyl phenol—15.1%
HEMA hydroxyethyl methacrylate 1.4%
Red Dye—Neozapon® from BASF Wyandotte Corp., Holland, Mich.—0.2%

The barrel temperature of the barrel of the extruder is 174° C.

The PLX resin-to-monomer ratio was varied. A pulse of 20 g of PLX resin was introduced at each state. The data gathered were then used to develop a model for predicting the concentration of the monomer and from that PLX is computable. This model dubbed Predmonomer12_3_97.

The model was used as shown below to control hardness of the extruded composition. The algorithm chose the composition of monomer required to give the required hardness. Hardness was related to the composition using a linear regression.

The procedure was conducted as follows:

1) Run the steady-state extrusion at 20 lbs./hr on the ZSK-30 but of unknown durometer hardness
2) Run 6 replicates of the 20 g PLX pulse and collect the pulse response files
3) Run the model (Predmonometer12_3_97) to predict the composition
4) From the composition, predict the durometer hardness.
5) From the target durometer hardness calculate the target composition that would give that hardness.
6) From the predicted and targeted composition, calculate the correction factor on the feed rate by
   k=target composition/predicted composition
7) Reset the monomer feed rate by new monomer feed rate=old monomer feed rate *k
8) Adjust the PLX so that the total feed is still 20 lbs/hr (9.1 kilograms per hour).
9) Repeat steps 2–9 until 0.9<k<1.1, then make on last correction and quit.
10) Determine the final product durometer hardness. The target durometer reading was 67.5 and that corresponded to a targeted conpositon of 23% monomer. The results of the test are summarized below:

| Run | Pred. Composition | Obs. Composition | k |
|---|---|---|---|
| 1 | 19% | 16.1% | 1.21 |
| 2 | 21% | 19.4% | 1.10 |
| 3 | 21.5 | 21.3 | 1.08 |
| Final | 23.1% | 23.1% | 1.0 |

Final Composition was identical to targeted 23% and the predicted hardness was 67.5 and the measured hardness was 68.6.

A second run was made with the same target of 67.5 durometer hardness.

| Run | Pred. Composition | Obs. Composition | k |
|---|---|---|---|
| 1 | 29.3% | 27.3% | 0.8 |
| 2 | 21% | 19.4% | 1.10 |
| 3 | 21.5 | 21.3 | 1.08 |
| Final | 23.1% | 21.3% | 0.0 |

Final Composition was identical to targeted 23% and the predicted hardness was 67.5 and the measured hardness was 68.6.

A second run was repeated with the same target of 67.5 durometer hardness.

| Run | Pred. Composition | Obs. Composition | k |
|------|-------------------|------------------|------|
| 1 | 29.3% | 27.3% | 0.8 |
| 2 | 21.3% | 21.8% | 1.08 |
| Final | 23.0% | 23.5% | |

The predicted hardness was 67.5% and the measured hardness was 69.2%.

EXAMPLE 2

Compounding of Nordel Rubber and HDPE Resin (I)

High density polyethlene resin, (HDPE), type Alathon 7030, and Nordel rubber, 3681 supplied by DuPont Dow, were compounded in a ZSK 30 mm extruder manufactured by Werner-Pfleiderer. Nordel is the trademark to a group of sulfur curable elastomers that are based on ethylene, propylene and 1,4 hexadiene. The Nordel was applied at barrel 5 and the HDPE at barrel 1 on the extruder. The extruder is run at 10 pounds per hour (4.5 kilograms per hour) throughput and 300 RPM. The barrel temperature setting was 220° C. The barrel temperature setting was 220° C. The barrel screw design is composed for five parts. Part 1 is a right hand conveying element of total 335 mm in length. Part 2 is KB42RU, 20/10 LH. Part 3 is the same as part except that it is 154 mm in length. Part 4 is KB14RH, 20/10LH. Part 5 is again conveying elements of 282 mm. The pulse was 6 grams of Nordel.

As in Example 1, experiments were run that provided the data to generate the model needed for control. These test correspond to running the composition from pure Nordel to Pure HDPE in steps of 10% decrease in Nordel and a 10% increase in HDPE. Based on the same methods described above, the data from the experiment were used to define a model call "tempmodel".

The experimented started with the extruder being run at 90% EPDM. The target was 78% EPDM. Three pulse tests were conducted at each state and results averaged. The model predictions and the observations are given below.

| Run | Pred. Composition | Obs. Composition | k |
|------|-------------------|------------------|-------|
| 1 | 84.5% | 90% | 0.947 |
| 2 | 94.8% | 85% | 0.85 |
| 3 | 75.0% | 72.5 | 1.07 |

The final composition was 77.5% and the target was 78%.

What is claimed is:

1. An improved process for controlling the properties of a mail extruded in a continuous extrusion process, the improvement comprising the application of multiple periodic pulses, throughout the entire period of the said continuous extension process, so as to provide continuous control over the properties of the continuously extended material, wherein the periodic pulse comprises:

(1) a pulse of known amount of material that is added to a steady extrusion process, (2) dynamic signals generated by a extruder drive and control system that are transmitted to data acquisition system signal conditioning front end hardware, which isolates, amplifies and filters the dynamic signals and outputs analog signals, and (3) analog signals output by the data acquisition system sign conditioning front end hardware are converted to digital signals, the digital signals are transmitted to a pulse analysis and control computer, which calculates setpoints, which are transmitted back to the extruder drive and control system or a feed control system used by the extrusion process.

* * * * *